Patented July 4, 1950

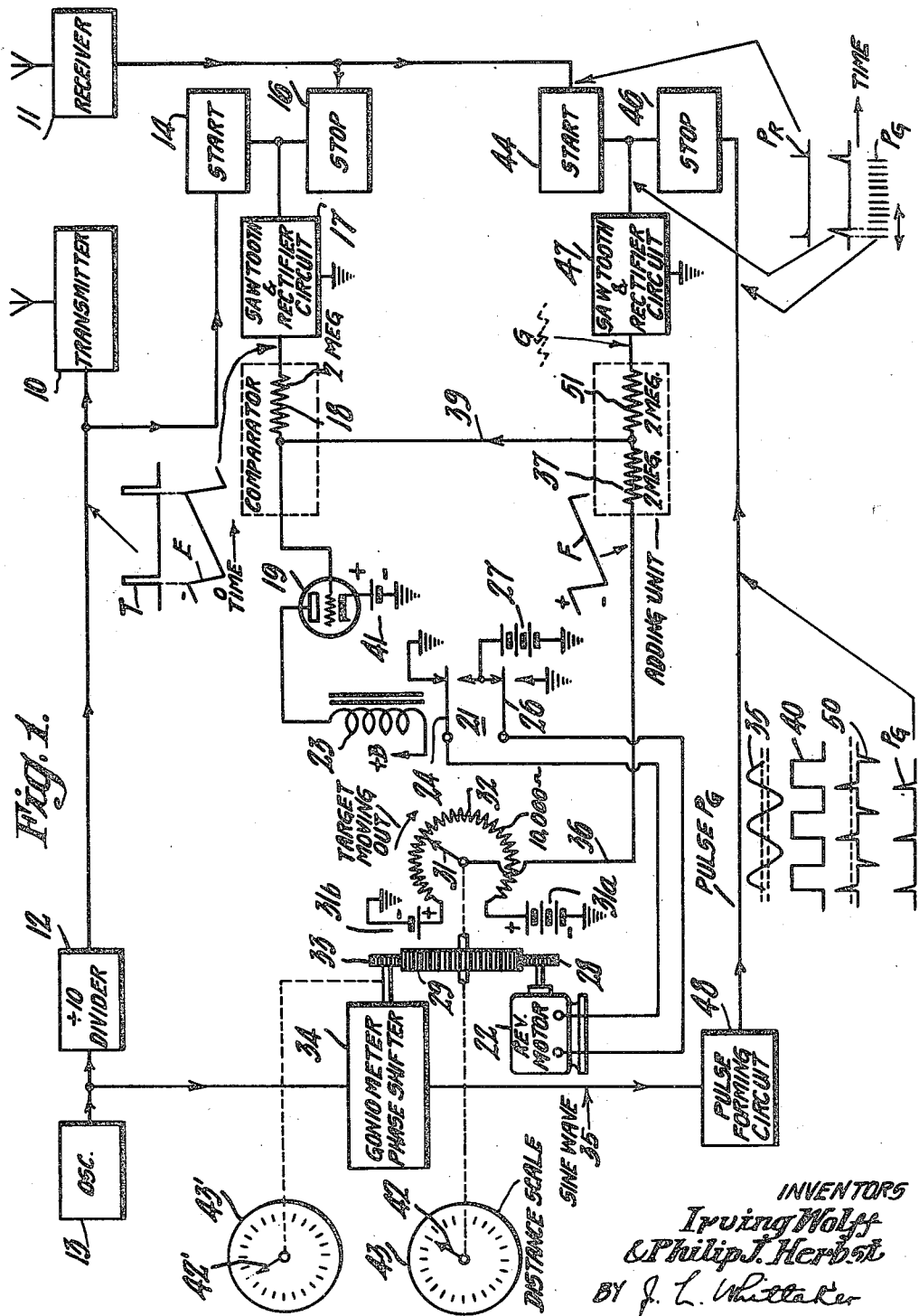

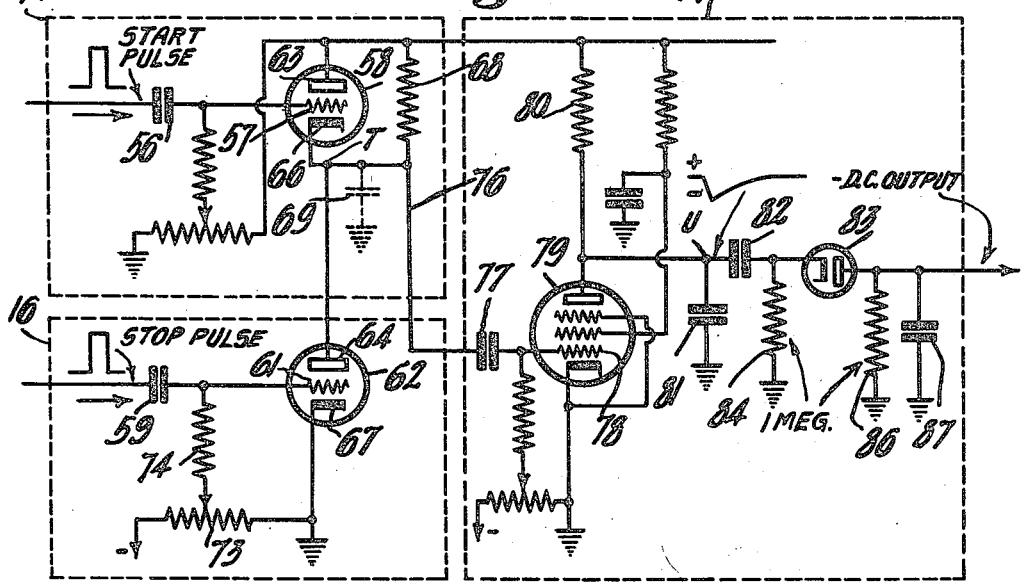
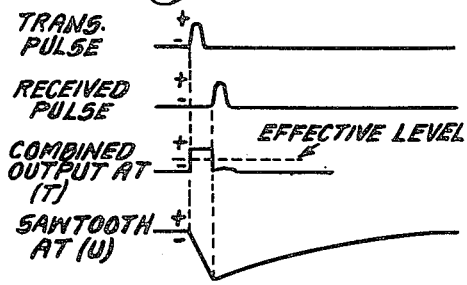
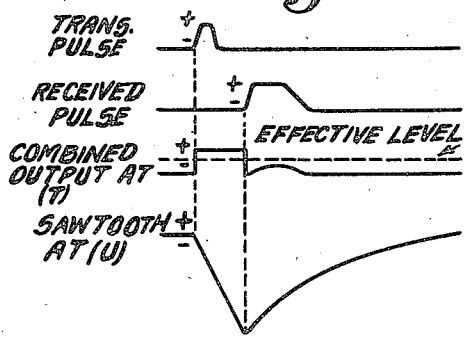
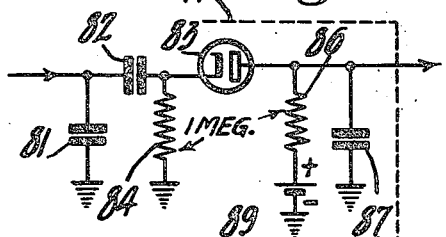

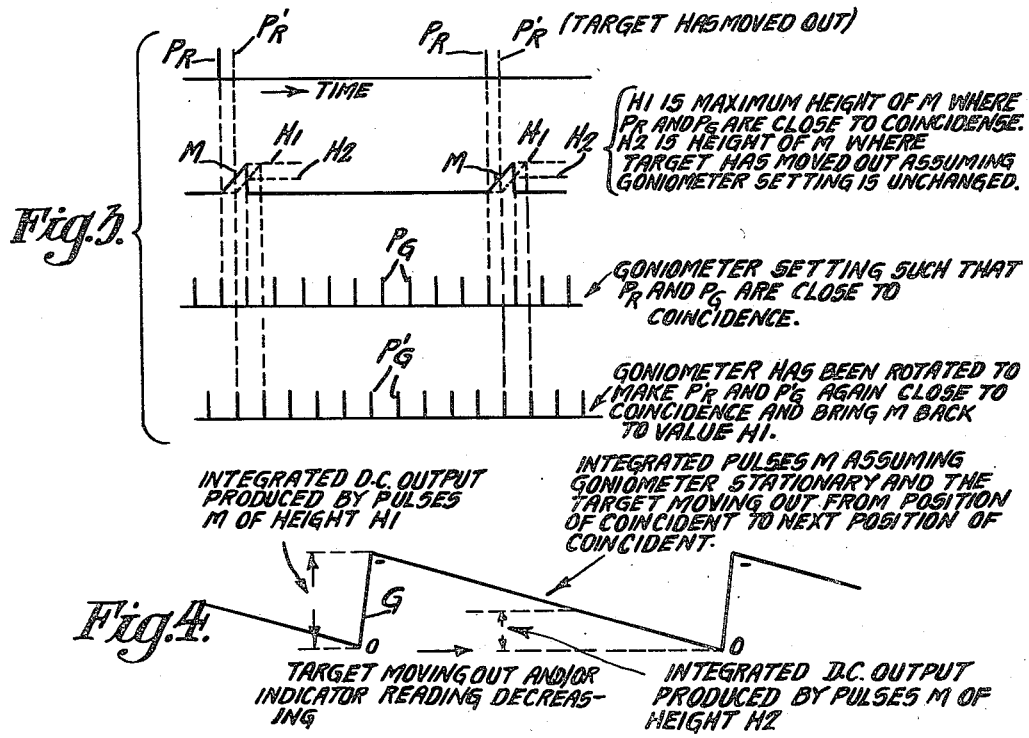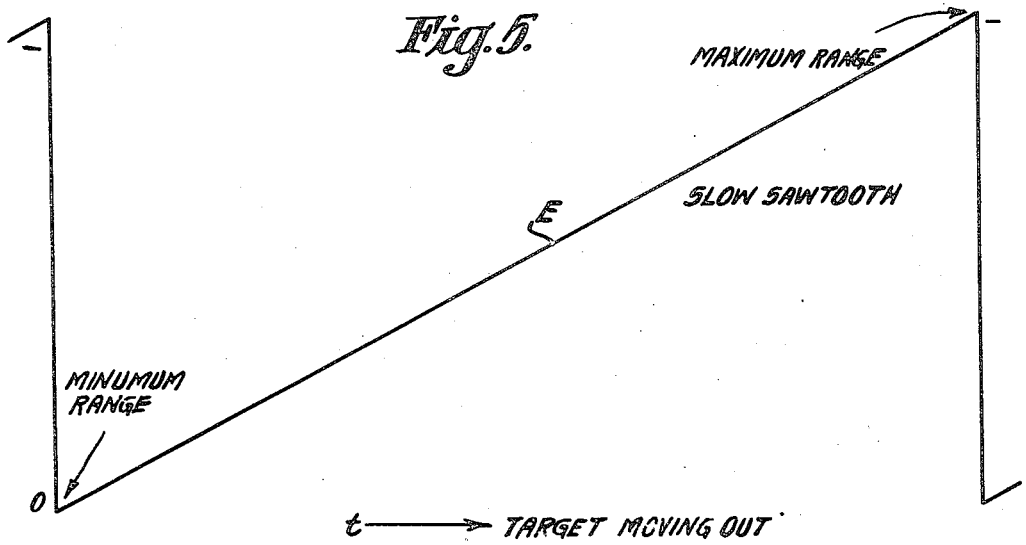

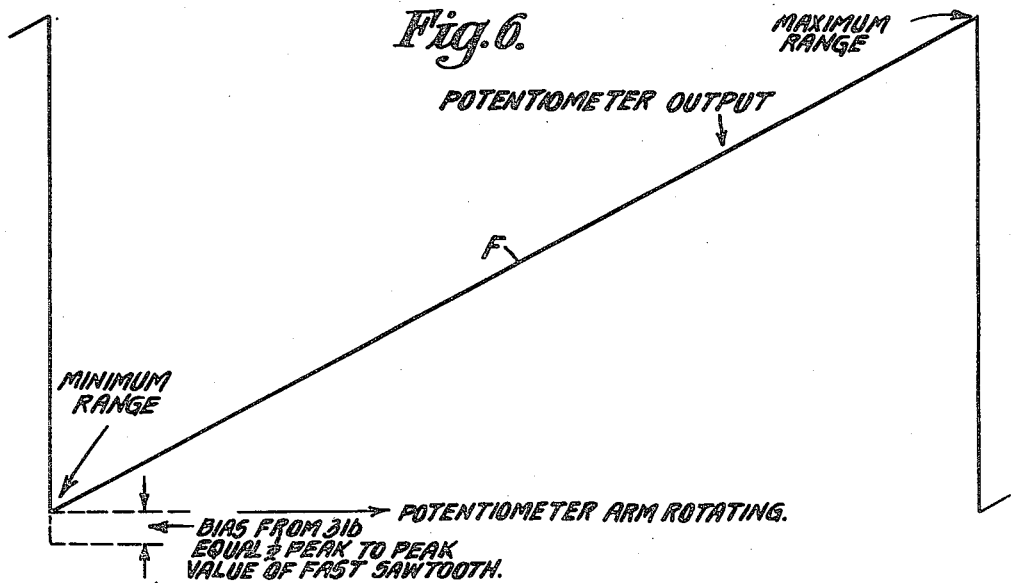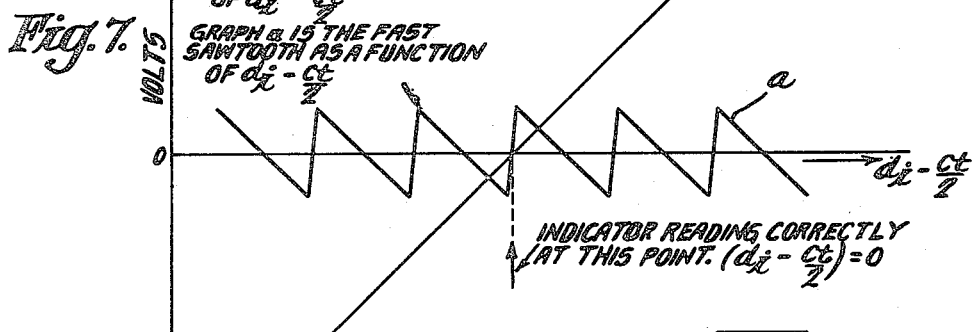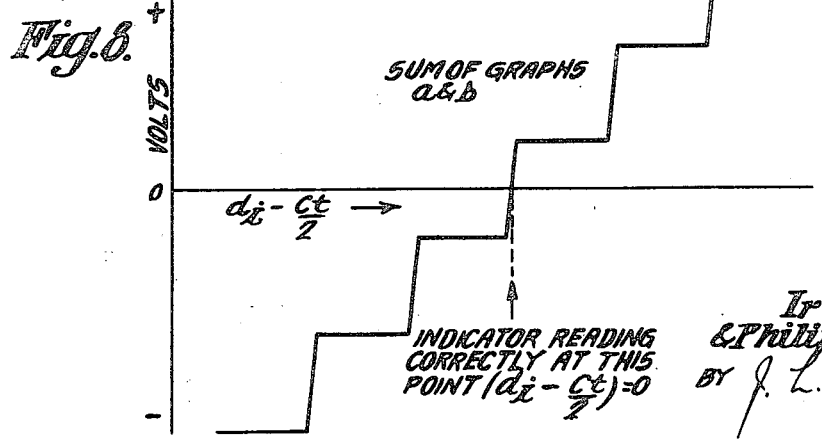

2,513,988

UNITED STATES PATENT OFFICE 2,513,988

PULSE ECHO ALTIMETER WITH MECHANICALLY DRIVEN INDICATOR

Irving Wolff, Princeton, and Philip J. Herbst, Moorestown, N. J., assignors to Radio Corporation of America, a corporation of Delaware Application July 22, 1948, Serial No. 40,146

12 Claims. (Cl. 343—13)

1

Our invention relates to radio distance measuring systems and particularly to systems of the pulse-echo type that provide a direct reading as by means of a pointer and dial.

An object of the invention is to provide an improved pulse-echo distance measuring system of the direct reading type.

A further object of the invention is to provide a pulse-echo distance measuring system of improved accuracy.

A still further object of the invention is to provide an improved pulse-echo radio altimeter of the type wherein the altitude is shown by a dial and pointer or similar indicating means.

A still further object of the invention is to provide a pulse-echo distance measuring system wherein a mechanical type distance indicating device provides an indication having an accuracy determined by pulse coincidence.

A still further object of the invention is to provide an improved method of and means for obtaining a distance reading in a pulse-echo distance measuring system.

According to the present invention there is a coarse control and a fine control in a system of the type that includes a servo or follow-up motor for driving the system to and for holding it at a balance point. The motor in the example to be described drives the contact arm of a balancing potentiometer to which is coupled the pointer of the distance indicating dial. In order to obtain the fine control the motor also drives a goniometer-type phase shifter through a plurality of rotation for each rotation of the potentiometer arm. The goniometer phase shifter is tied into the system so as to produce a repetitive voltage as the goniometer is rotated. This repetitive voltage is a function of the angular position of the goniometer rotor and of the propagation time of a transmitted pulse in travelling to the reflecting object or target.

In effect, the voltage from the balancing potentiometer is balanced against a comparison voltage that is a function of the propagation time to the target thus providing the coarse control, and is also balanced against the repetitive voltage thus providing the fine control. Circuitwise, in the example described, the sum of the potentiometer voltage and the repetitive voltage is balanced against the comparison voltage that is a function of the propagation time to the target.

The invention will be better understood from the following description taken in connection with the accompanying drawing in which:

2

Figure 1 is a circuit and block diagram of one embodiment of the invention,

Figure 2 is a circuit diagram of a start-stop circuit that may be employed in the system of Figure 1, Figures 2a and 2b are groups of graphs that are referred to in explaining the operation of Figure 2, Figure 2c is a circuit diagram showing how a portion of Figure 2 may be modified.

Figure 3 is a group of graphs that are referred to in explaining the operation of the system of Figure 1, particularly with reference to the start-stop circuit associated with the goniometer, Figure 5 is a graph showing the direct-current output of the other start-stop circuit of Figure 1, Figure 6 is a graph showing the output of the potentiometer that is geared to the goniometer in Figure 1, and Figures 7 and 8 are graphs that are referred to in explaining the operation of the system of Figure 1.

In the several figures, similar parts and graphs are indicated by similar reference characters.

Figure 1 shows an embodiment of the invention comprising a radio pulse transmitter 10 and a pulse receiver 11 for receiving the transmitted pulses after reflection from an object or surface the distance of which is to be determined. The duration and repetition period of the transmitted radio pulses are determined by the usual considerations such as the desired resolution, the desired range, etc., as is well understood in the radar art.

The modulating pulses T are obtained from a frequency divider 12 that is supplied with a sine wave signal from an oscillator 13 which preferably is crystal controlled.

The portion of the system that would by itself give a coarse distance reading will now be described. It comprises a start-stop circuit indicated by the blocks 14, 16 and 17. The modulating pulses T are applied to the start portion 14 and the received pulses $P_R$ are applied to the stop portion 16. A circuit of this type will be described hereinafter in connection with Figure 2. The output of the sawtooth and rectifier block 17 is a direct current or D.-C. voltage E of negative polarity having an amplitude that is a function of the distance out to the target or reflecting object as will be explained hereinafter. This voltage E, which is represented by the graph in Fig. 5, will be referred to as the comparison voltage.

In order to obtain a dial reading of the target distance, the D.-C. output of block 17 is applied through a high impedance, such as a 2 megohm resistor 18, to the grid of a vacuum tube 19. The tube 19 is for operating a relay 21 to drive a servo or follow-up motor 22 in one direction or the other. In the example shown, the relay 21 is of the marginal type but other types may be preferred. The relay coil 23 is in the plate circuit of tube 19 and pulls armatures 24 and 26 to an "up" position or releases them to a "down" position. Thus a battery 27 drives the motor 22 in one direction or the other depending upon whether the voltage on the grid of tube 19 is above or below a certain value.

The motor 22 is coupled through gears 28 and 29 to the rotatable arm 31 of a follow-up potentiometer 32. It is also coupled through an additional gear 33 to a goniometer-type phase shifter 34 for obtaining the desired fine distance reading as explained hereinafter. The design of the phase shifter 34 may be of any suitable conventional design but preferably it is as described in application Serial No. 677,450, now Patent No. 2,442,097, issued May 25, 1948, filed June 18, 1946, in the name of Stuart W. Seeley and entitled Electrical Networks for Phase Shifters. In the present example, the gearing 29, 33 has a 10 to 1 ratio. The potentiometer arm 31 supplies a positive voltage through a lead 36, a high resistance resistor 37, such as a 2 megohm resistor, and a lead 39 to the grid end of the resistor 18. A battery 31a maintains a flow of current through the potentiometer resistor 32. A battery 31b is provided to maintain a certain voltage difference between the comparison voltage E and the potentiometer voltage F when the system is in balance for reasons that will be apparent hereinafter.

The above-described portion of the system by itself would operate as follows:

When reflected signals are received from a particular target, the potentiometer arm 31 is driven to a position on resistor 32 where the resistor voltage is equal to the voltage supplied from the block 17 so that the sum voltage is zero, since the two voltages are of opposite polarity. Thus zero voltage is applied to the grid of tube 19 and the relay armatures go to a neutral or mid-way position to stop the motor 2. This relay action is obtained by properly biasing the tube 19, as by a cathode circuit battery 41, and by properly adjusting the relay 21.

The pointer 42 of a dial 43 having a distance scale thereon is coupled to the potentiometer arm 31 so that it also is driven to a position that is a function of target distance whereby the distance can be read off the distance scale, also, for obtaining a more exact reading a pointer 42' of a dial 43' is coupled to the shaft of the goniometer 34.

Assume now, for example, that the target moves out to increase the distance. Then the output from block 17 increases, the relay 21 operates to make motor 22 drive the potentiometer arm 31 in the direction indicated by the arrow to supply an increased potentiometer voltage to balance the increased voltage from block 17. When the two voltages are again equal, the armatures of relay 21 again go to the mid-way position and the motor 22 is stopped. The reverse action takes place when the target moves in to decrease the distance.

According to the present invention, the system comprises additional circuit means in combination with the above-described portion of the system whereby a fine or exact positioning of the distance pointer 42 is obtained. In the specific example being illustrated, this additional circuit includes a second start-stop circuit represented by the blocks 44, 46 and 47.

The start-stop circuit 44, 46, 47 is controlled by the received pulses $P_R$ that are supplied from receiver 11 to the "start" position 44 of the start-stop circuit and by comparatively high repetition rate pulses $P_G$ that are supplied from a pulse-forming circuit 48 to the "stop" portion 46 of the start-stop circuit.

The comparatively high frequency pulses $P_G$ are produced by supplying sine wave signal from the oscillator 13 through the goniometer phase shifter 34, and by supplying the resulting phase-shifted sine wave 35 to the pulse-forming circuit 48. Thus the phase or timing of the pulses $P_G$ is a function of the position of the rotor of the goniometer 34. The pulse-forming circuit 48 may be of well known design comprising a clipping circuit for clipping the wave 35 to obtain a square wave 49. The wave 49 is differentiated to obtain the wave 50 which is clipped to obtain the desired pulses $P_G$.

The output of the start-stop block 47 is a direct current having an amplitude that is a function of the time or phase relation of the received pulses $P_R$ and the pulses $P_G$; therefore, this output is a function of the propagation time from the transmitter to the target and of the angular position of the goniometer rotor.

The output from block 47 is applied with negative polarity through a high impedance, such as a 2 megohm resistor 51, and through the lead 39 to the grid end of resistor 18.

From the foregoing description, it will be seen that the potentiometer output and the output from the start-stop circuit 44, 46, 47 are added to obtain a sum output at the adding unit 37, 51, and that this sum output and the output from the start-stop circuit 14, 16, 17 are compared or subtracted at the comparator unit 18. It should be understood that the invention is not limited to the particular adding or comparison circuit illustrated as other suitable circuits are well known in the art.

Before describing the system operation in more detail, reference will be made to Fig. 2 showing the details of one form of suitable start-stop circuit.

Fig. 2 shows a specific form of start-stop circuit that is described and claimed in application Serial No. 728,861, filed February 15, 1947, in the name of Randall C. Ballard and entitled Indicator Circuit for Pulse Altimeter.

The start pulses are supplied through a blocking condenser 56 to the grid 57 of a vacuum tube 58. In the start-stop circuit 14, 16, 17 the start pulses are the transmitter modulating pulses. The stop pulses are supplied through a blocking capacitor 59 to the grid 61 of a vacuum tube 62. In the start-stop circuit 14, 16, 17 the stop pulses are the received pulses.

The vacuum tube 58, which acts as a cathode follower tube, has the operating voltage applied directly to its anode 63 and has the anode-cathode impedance of the tube 62 connected in its cathode circuit, the anode 64 of tube 62 being connected directly to the cathode 66 of the tube 58 and the cathode 67 of the tube 62 being connected to ground.

Operating voltage is applied to the anode 64 of tube 62 through a resistor 68 of high impedance. The distributed capacity between the cathode 66 and ground is indicated at 69. The capacity 69 may be of the order of five or ten micromicrofarads and serves to hold the cathode 66 at the potential above ground to which it is driven when a pulse appears on the grid 57.

The grid 57 of tube 58 has a slightly positive bias potential applied to it from potentiometer resistor 71 by way of a grid resistor 72. The grid 61 of the tube 62 has a negative bias applied to it from a bias resistor 73 by way of a grid resistor 74, this bias voltage being sufficient to bias the tube 62 to cut-off.

The operation by which pulses appear on the cathode 66 or junction point T having a duration equal to the interval between the start pulse and the stop pulse will be better understood by referring to Figs. 2a and 2b. In Fig. 2a there is illustrated the condition where the time interval between a transmitted pulse and the received pulse is comparatively short. As soon as the transmitter modulating pulse of positive polarity appears on the grid 57, the junction point T goes positive as indicated by the graph marked "combined output," this being the result of the cathode 66 following the grid potential due to the cathode follower action. As soon as the positive received pulse appears on the grid 61 of tube 62, the tube 62 becomes conducting and bring the point T back substantially to ground potential. Thus, a positive pulse appears at T having a duration equal to the time interval between the front edges of the two applied pulses.

Referring to Fig. 2b, the same action takes place but in this instance the time interval between transmitted and received pulses is greater than in the first example. The function of the distributed capacity 69 is evident here as well as in Fig. 2a as it will be noted that the positive pulse of the "combined output" at T maintains its voltage level after the termination of the transmitted pulse. Upon the reception of the reflected pulse, the resulting low impedance of the tube 62 brings the point T back substantially to ground potential. As before, the width of the positive pulse at point T is a measure of the time interval between the front edges of the two applied pulses.

The pulses taken off the point T are applied through a lead 76 and a blocking capacitor 77 to the control grid 78 of a pentode 79 which functions as the discharge tube of a sawtooth wave producing circuit. A capacitor 81 across which a sawtooth voltage is to be produced is connected between ground and the anode of the pentode 79. Positive D.-C. voltage is applied to capacitor 81 through the plate resistor 80 of the pentode 79.

The pentode 79 is biassed beyond cut-off and the capacitor 81 charges to full plus B potential between successive pulses taken from the point T. Each time a positive pulse from the point T is applied to the grid 78 of the discharge tube, the capacitor 81 partially discharges through the tube 79. The amount of this discharge depends upon the duration of the applied pulse. Therefore, the amplitude of the resulting sawtooth wave produced across capacitor 81 is a function of the duration of the pulse applied from point T. This is illustrated by the graphs in Figs. 2a and 2b.

Preferably, the amplitude of the pulse from the point T is sufficient to drive the grid 78 of the pentode 79 positive so as to make it draw grid current. This effectively clips the pulse at the grid 78 so that any variations in the pulse amplitude above a certain voltage level, indicated as the "effective level" in Figs. 2a and 2b, will not affect the discharge rate of the sawtooth capacitor 81. The sawtooth voltage from capacitor 81 is applied through a capacitor 82 to the cathode of a diode 83. Resistors 84 and 86 are connected from the cathode and the anode, respectively, of the diode 83 to ground, and a filter capacitor 87 is connected across the resistor 86. This provides a direct current output of negative polarity.

The start-stop circuit 44, 46, 47 may be the same as shown in Fig. 2 although, as shown in Fig. 2c, it may be preferred to provide in the rectifier output circuit a bias battery 89 in place of the potentiometer bias battery 31b shown in Fig. 1.

Figs. 3 and 4 illustrate more clearly the operation of the start-stop circuit 44, 46, 47 to which the received pulses and the goniometer-controlled pulses are applied. Assuming that these pulses are being applied to the start-stop circuit in nearly coincident phase relation as indicated in Fig. 3 by the pulses $P_R$ and $P_G$, then the resulting recurring sawtooth pulse M will have its maximum amplitude H1 as shown when the pulse $P_G$ immediately follows the pulse $P_R$. When the pulse $P_G$ immediately precedes the pulse $P_R$ then the sawtooth pulse M has minimum value. From minimum value to maximum value there is a very rapid change in amplitude. The sawtooth wave M corresponds, of course, to the sawtooth waves shown in Figs. 2a and 2b.

Now assume the target moves out and assume that the goniometer setting has not changed. Now the received pulses $P'_R$ starts the sawtooth pulse later but it is still stopped at the same time by a pulse $P_G$ whereby the sawtooth height is now H2. Any motion of the goniometer to move the indicator to greater distances will increase the time between start and stop and have the same effect on the output of the start-stop circuit as reducing the target distance again would have. Thus the output of this circuit depends not only on the target position or the indicator position but on the extent to which they are brought into coincidence.

Now referring to Fig. 4, the graph G shows the direct current output that would be supplied from the start-stop circuit 44, 46, 47 if the target were moving out and the goniometer were stationary, or if the target were stationary and indicator readings were decreasing or if both were happening simultaneously. It will be seen that the output is maximum near pulse coincidence and decreases until the received pulse is near coincidence with the next goniometer-controlled pulse. This same wave G is shown in Fig. 7 as the wave $a$ plotted against $$d_i - \frac{ct}{2}$$

instead of against $t$ as will be understood from the description of operation that follows. It will be seen that the wave is repetitive, there being one sawtooth for each goniometer-controlled pulse. There are, in the example shown, ten goniometer-controlled pulses $P_G$ for each received pulse $P_R$.

The complete operation of the system may be explained as follows:

(1) A pulse is radiated from the transmitter, and at a time $t$ later the pulse reflected from the target at distance $d$ returns to the receiver. The distance and time are related by the expression $$t = \frac{2d}{c}$$

where $c$ is the velocity of transmission of radio waves.

(2) The servo-operated indicator is operated by the returning pulse. If $d_i$ is the distance indicated on the indicator, then $$d_i = d - \frac{ct}{2}$$

for correct operation of the equipment.

(3) If $d_i$ is not equal to $$\frac{ct}{2}$$

a signal is applied to the servomotor to rotate the indicator to make $$d_i = \frac{ct}{2}$$

This is explained more fully below.

(4) The signal applied to the servomotor control is made up of (a) the signal generated by the fast sawtooth operated by the goniometer with the object of supplying a very rapidly changing signal of high accuracy for deviation from $$d_i = \frac{ct}{2}$$

and (b) two other signals which when added serve to remove ambiguity in the signal furnished by (a). These two signals are obtained by means of the potentiometer attached to the indicator and by means of the slow sawtooth voltage started by the outgoing pulse and stopped by the received pulse.

The way in which these signals add may best be shown in the following way:

The goniometer is geared to the indicator in such a way that the distance indicated when it rotates through one complete rotation is $$\frac{c}{2f}$$

where $f$ is the frequency applied to the goniometer from the crystal controlled oscillator 13. Thus, if the system is adjusted so that the center of the step in the fast sawtooth wave coincides with the received pulse when the indicator registers zero and the distance of the target is zero, the indicator will read correctly providing the received pulse always coincides with the same step in the fast sawtooth. The reason for this is apparent when it is remembered that N rotations of the goniometer in the correct direction exactly delays the phase of the impressed frequency wave by 360 N degrees or can be considered to introduce a time delay of $$t_s = \frac{N}{f}$$

The indicator is calibrated so that the distance indicated ($d_i$) for N rotations is $$\frac{Nc}{2f}$$

(see above). The time taken for a radio wave to travel to a target at this distance and return is $$\frac{2}{c}\left(\frac{Nc}{2f}\right) = \frac{N}{f}$$

which is exactly the time delay introduced by the goniometer in the locally generated pulse. For intermediate distances the accuracy is affected by the linearity of the goniometer phase-rotation characteristic but is always independent again of this characteristic at the distances $$\frac{Nc}{2f}$$

In Fig. 7, graph a, is shown the voltage developed by the fast sawtooth to rotate the motor as a function of deviation of the indicator from its correct position. Since the indicator reads correctly when $$d_i - \frac{ct}{2} = 0$$

this may be plotted in terms of $$d_i - \frac{ct}{2}$$

In order to have the indicator rotation correct, a voltage must be supplied for all $$d_i - \frac{ct}{2} > 0$$

to make $d_i$ less and conversely for $$d_i - \frac{ct}{2} > 0$$

Fig. 7, graph a, shows that the operation can be made correct for small deviations from $$d_i - \frac{ct}{2} = 0$$

but that there are a number of other positions at which the servo could lock spaced from the correct value.

The voltages added by the slow sawtooth and the potentiometer eliminate these incorrect locking points without affecting the operation in the neighborhood of the correct point materially.

Since the slow sawtooth current output does not depend on the indicator position it is a function of $t$ alone. Conversely since the potentiometer output depends only on the indicator position its output is a function of $d_i$ alone. However the nature of the constant chosen for the operation of these circuits causes them in combination to be a function of $$d_i - \frac{ct}{2}$$

This results because the slopes as a function of $d_i$ and $t$ are chosen to make the output of the two circuits equal and opposite in sign when $$d_i = \frac{ct}{2}$$

i. e. if the slow sawtooth circuit output is $k_1 t$ and the potentiometer output is $k_2 d_i$ then $$\frac{k_2}{k_1} = \frac{-2}{c}$$

The sum of the slow sawtooth output and the potentiometer output is plotted as a function of $$d_i - \frac{ct}{2}$$

in Fig. 7, graph b. Although the ratio of $k_2$ to $k_1$ is set by the conditions imposed, their magnitude is disposable providing the ratio is maintained. The value of $k_1$ is chosen to make the slope of the slow sawtooth as a function of $t$ the same in magnitude but opposite in sign to that of the fast sawtooth. Since the fast sawtooth and the sum of the slow sawtooth and the potentiometer output are now all plotted in terms of the same variable $$\left(d_i - \frac{ct}{2}\right)$$

they may be added directly to give the step $c$ shown in Fig. 8. This represents the output applied to the motor control circuit in the equipment and gives the following desirable features:

1. Output O for $$d_i = \frac{ct}{2}$$

2. Very rapid variation in voltage to return indicator to $$d_i = \frac{ct}{2}$$

for variation from this value.
3. No ambiguity.
4. Inherent accuracy.

In the description with reference to Fig. 7, it has been assumed for convenience of explanation that the slow sawtooth wave E (Fig. 5) and the potentiometer output F (Fig. 6) are added together, although in Fig. 1 and in the accompanying description it is indicated that the potentiometer output F and the fast sawtooth wave G (Fig. 4) are added. There is no error in referring to the addition in two different ways because, as is well known, the order of addition of the waves E, F and G is immaterial.

We claim as our invention:

1. A distance measuring system comprising means for transmitting pulses of energy, means at substantially the same location as the transmitting means for receiving said pulses after reflection from an object or surface, means for producing a comparison voltage that has an amplitude that is a function of the time interval between the transmission of a pulse and reception of said pulse after reflection, a follow-up circuit comprising means for producing a follow-up voltage that also has an amplitude that is a function of said time interval and is at least approximately proportional to said comparison voltage, means for producing a series of accurately-spaced pulses, means for synchronizing the transmission of the transmitted pulses with selected ones of said accurately-spaced pulses, a distance indicator for indicating distance from said transmitting means to said reflecting object, a phase shifter for shifting the phase of said control pulses through more than 360 degrees, means including said follow-up circuit for operating said distance indicator and for causing said phase shifter to shift the phase of said control pulses as a function of said time interval, means for producing a repetitive voltage that has an amplitude that is a function of the time interval between one of said control pulses and one of said received pulses, means for adding algebraically said follow-up voltage, said repetitive voltage and said comparison voltage to obtain a follow-up control voltage that has the form of a step when plotted as a function of $$d_i - \frac{ct}{2}$$

where $d_i$ is the distance indicated on said indicator, $c$ is the velocity of transmission of radio waves, and $t$ is the time taken for a radio wave to travel from the transmitter to the reflecting object and back to the transmitter, and means for operating said follow-up circuit by said follow-up control voltage.

2. A distance measuring system comprising means for transmitting pulses of energy, means at substantially the same location as the transmitting means for receiving said pulses after reflection from an object or surface, means for producing a comparison voltage that has an amplitude that is a function of the time interval between the transmission of a pulse and reception of said pulse after reflection, a follow-up circuit comprising means for producing a follow-up voltage that also has an amplitude that is a function of said time interval and is at least approximately proportional to said comparison voltage, means for producing control pulses that have a repetition rate that is a multiple of the repetition rate of said transmitted pulses, a distance indicator for indicating distance from said transmitting means to said reflecting object, a phase shifter for shifting the phase of said control pulses through more than 360 degrees, means including said follow-up circuit for operating said distance indicator and for causing said phase shifter to shift the phase of said control pulses as a function of said time interval, means for producing a repetitive voltage that has an amplitude that is a function of the time interval between one of said control pulses and one of said received pulses, means for adding algebraically said follow-up voltage, said repetitive voltage and said comparison voltage to obtain a follow-up control voltage that has the form of a step when plotted as a function of $$d_i - \frac{ct}{2}$$

where $d_i$ is the distance indicated on said indicator, $c$ is the velocity of transmission of radio waves, and $t$ is the time taken for a radio wave to travel from the transmitter to the reflecting object and back to the transmitter, and means for operating said follow-up circuit by said follow-up control voltage.

3. A pulse-echo distance measuring system comprising means for transmitting pulses of energy and receiving them after reflection from an object, means for producing a first voltage having an amplitude that is a function of the time interval between transmission of a pulse and reception of said pulse after reflection, a main distance indicator that indicates full range and a phase shifter which is geared to said indicator so that it is driven through 360 electrical degrees a plurality of times as said indicator is driven through its full range, means for producing a voltage whose amplitude is a function of the angular position of the phase shifter and of said time interval, means comprising a follow-up circuit for driving said distance indicator, said follow-up circuit including means for developing a third voltage as a function of the indicator position, and means for combining said three voltages in said follow-up circuit to position said distance indicator.

4. The invention according to claim 3 wherein a vernier distance indicator is coupled to said phase shifter to be driven thereby.

5. A pulse-echo distance measuring system comprising means for transmitting pulses of energy and receiving them after reflection from an object, means for producing a first voltage having an amplitude that is a function of the time interval between transmission of a pulse and reception of said pulse after reflection, a distance indicator and a goniometer phase shifter which are geared together, means for producing a repetitive voltage as said phase shifter is rotated with the amplitude of the repetitive voltage, a function of the angular position of the phase shifter and of said time interval, means comprising a follow-up circuit for driving said distance indicator, said follow-up circuit including means for developing a third voltage as a function of the indicator position, and means for combining said three voltages in said follow-up circuit to position said distance indicator.

6. A pulse-echo distance measuring system comprising means for transmitting pulses of energy and receiving them after reflection from an object, an indicator for indicating the distance to said object, means for producing a first voltage which is a periodic function of said distance indicator reading and of the time interval between transmission and reception of a pulse, said function having a form that includes a steep slope, means for producing a second voltage which is a function only of said distance indication, means for producing a third voltage which is a function only of said time interval, means for combining said three voltages, and means for driving said distance indicator for maintaining said combination at a predetermined value.

7. A pulse-echo distance measuring system comprising means for transmitting pulses of energy and receiving them after reflection from an object, an indicator for indicating the distance to said object, means for producing a sawtooth voltage which is a periodic function of said distance indicator reading and of the time interval between transmission and reception of a pulse, said function having a form that includes a steep slope, means for producing a second voltage which is a function only of said distance indication, means for producing a third voltage which is a function only of said time interval, means for combining said three voltages, and means for driving said distance indicator for maintaining said combination at a predetermined value.

8. A pulse-echo distance indicator comprising means for transmitting pulses of energy, means for receiving said pulses after reflection from an object, means for producing a comparison voltage that is a function of the time interval between transmission and reception of each of said pulses, a mechanical type distance indicator, means comprising a follow-up circuit for driving said indicator as a function of said time interval, said follow-up circuit including means for producing a follow-up voltage and balancing it against said comparison voltage, a phase shifter that may be driven to shift the phase of an applied signal by more than 360 degrees, means for applying to said phase shifter a signal having a repetition rate that is a multiple of the repetition rate of said transmitted pulses, means for driving said phase shifter by said follow-up circuit as a function of said time interval and for causing it to shift the phase of said applied signal through 360 degrees times said multiple as said follow-up voltage goes from its minimum value to its maximum value, means for producing a repetitive voltage as said phase shifter is driven repeatedly through its 360 degree phase shift position with said repetitive voltage having an amplitude that is a function of the angular position of the phase shifter and of said time interval between transmission and reception of a pulse, and means for further controlling said follow-up circuit by applying said repetitive voltage thereto and balancing it against said comparison voltage.

9. A distance measuring system comprising means for transmitting pulses of energy, means at substantially the same location as the transmitting means for receiving said pulses after reflection from an object or surface, means for producing a comparison voltage that has an amplitude that is a function of the time interval between the transmission of a pulse and reception of said pulse after reflection, a follow-up circuit comprising means for producing a follow-up voltage that also has an amplitude that is a function of said time interval and is at least approximately proportional to said comparison voltage, means for producing control pulses that have a repetition rate that is a multiple of the repetition rate of said transmitted pulses, a distance indicator for indicating distance from said transmitting means to said reflecting object, a phase shifter for shifting the phase of said control pulses through more than 360 degrees, means including said follow-up circuit for operating said distance indicator and for causing said phase shifter to shift the phase of said control pulses as a function of said time interval, means for producing a repetitive voltage that has an amplitude that is a function of the time interval between one of said control pulses and one of said received pulses, means for adding algebraically said follow-up voltage and said repetitive voltage to obtain a sum voltage, means for adding algebraically said sum voltage of one polarity with said comparison voltage of the opposite polarity to obtain a follow-up control voltage, and means for operating said follow-up circuit by said follow-up control voltage.

10. A distance measuring system comprising means for transmitting pulses of energy, means for receiving said pulses after reflection from an object or surface, means for obtaining a voltage that is a function of the time interval between the transmission of a pulse and its reception after reflection, a distance indicator and a phase shifter that are geared together, a follow-up system for driving said indicator as a function of said time interval, said follow-up system including means for producing a follow-up voltage that is a function of said indicator reading, means for obtaining an alternating-current voltage whose phase or timing is a function of said indicator reading, and means for causing said follow-up system to drive said indicator to a position that is determined by the relative amplitudes of said three voltages as determined by the time a reflected pulse is received.

11. A pulse-echo system comprising a main distance indicator that indicates full range and a phase shifter geared to said indicator so that it is driven through 360 electrical degrees a plurality of times as said indicator is driven through its full range, means for transmitting pulses of energy to a reflecting object and means for receiving said pulses after reflection, means for producing a first voltage that varies as a function of the time interval between transmission and reception of a reflected pulse, means for producing a voltage that repeats each time said phase shifter is driven through 360 electrical degrees and that varies in phase or timing as a function of the position of the phase shifter, and means for driving said indicator to a position that is determined by the amplitude of said first voltage that is reached during said time interval and by the amplitude of said repetitive voltage that is reached in the time interval between an instant determined by the phase-shifter position and the instant of reception of a received pulse.

12. A pulse-echo system comprising a main distance indicator that indicates full range and a phase shifter geared to said indicator so that the phase shifter is driven through 360 electrical degrees a plurality of times as said indicator is driven through its full range, means for transmitting pulses of energy to a reflecting object and means for receiving said pulses after reflection, means for producing a first voltage that varies as a function of the time interval between transmission and reception of a reflected pulse, means for producing a voltage that repeats each time said phase shifter is driven through 360 electrical degrees and that varies in phase or timing as a function of the position of the phase shifter, means for obtaining a control voltage that is a function of the time interval between a point in the cycle of said repetitive voltage and the reception of a reflected pulse, and means including a potentiometer means that produces a follow-up voltage that is a function of said indicator reading for driving said indicator to a position that is determined by the amplitude of said first voltage that is reached during said time interval and by the amplitude of said control voltage.

IRVING WOLFF.
PHILIP J. HERBST.

REFERENCES CITED

The following references are of record in the file of this patent:

UNITED STATES PATENTS

| Number | Name | Date |
| --- | --- | --- |
| 2,422,074 | Bond | June 10, 1947 |